United States Patent [19]
Yamada et al.

[11] 3,814,833
[45] June 4, 1974

[54] ELECTRIC EQUIPMENT CHANNEL

[75] Inventors: Kiyoshi Yamada; Tadashi Kobayashi; Kazushige Morisue, all of Osaka, Japan

[73] Assignee: Matsushita Electric Works, Ltd., Osaka, Japan

[22] Filed: June 13, 1972

[21] Appl. No.: 262,300

[30] Foreign Application Priority Data
June 14, 1971  Japan.............................. 46-42292
June 14, 1971  Japan.............................. 46-42295
June 14, 1971  Japan.............................. 46-42296

[52] U.S. Cl. .................................................. 174/48
[51] Int. Cl. ................................................ H02g 3/28
[58] Field of Search .......... 174/48, 49; 52/221, 301

[56]  References Cited
UNITED STATES PATENTS
3,377,756  4/1968  Polhamus......................... 174/48 X
3,462,892  8/1969  Meyer............................... 174/49 X
3,609,211  9/1971  Van Herk............................ 174/49

Primary Examiner—J. V. Truhe
Assistant Examiner—David A. Tone
Attorney, Agent, or Firm—Wolfe, Hubbard, Leydig, Voit & Osann, Ltd.

[57]  ABSTRACT

A pillar-shaped electric equipment channel fixed between the ceiling and the floor of a building for controlling concentratively all electric systems required for all living functions such as power system, alarming systems, communicating systems and the like. Respective main control devices of these systems are all fitted in the channel substantially on one surface thereof.

1 Claim, 10 Drawing Figures

3,814,833

Fig. 5A-1   Fig. 5B-1   Fig. 5C-1
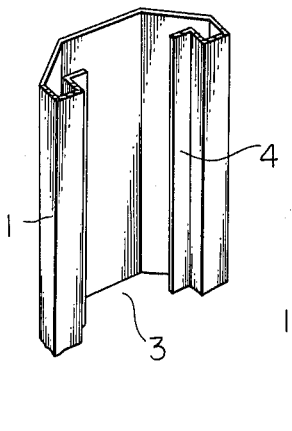 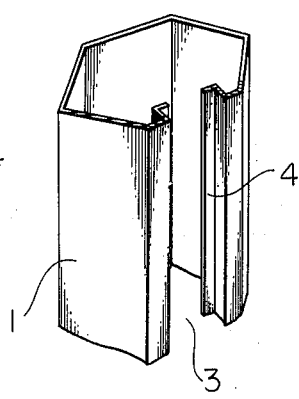 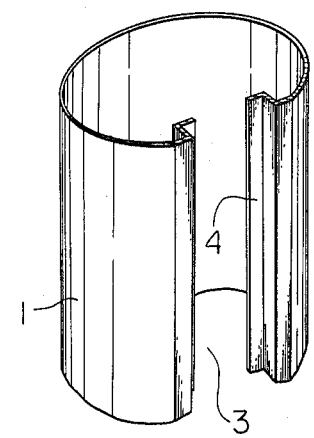
Fig. 5A-2   Fig. 5B-2   Fig. 5C-2
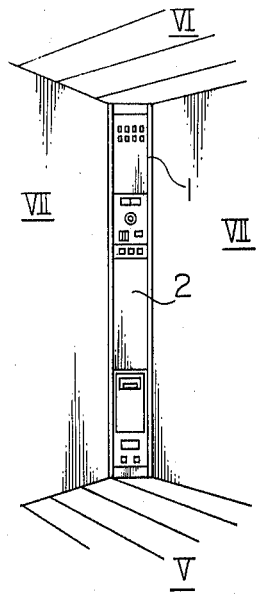 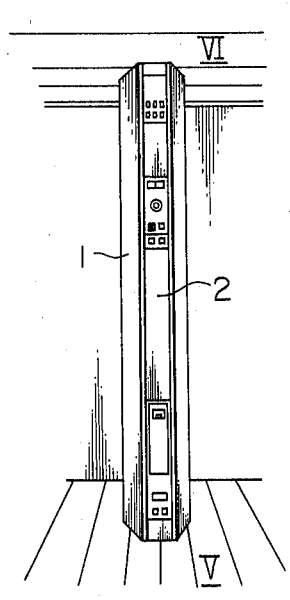 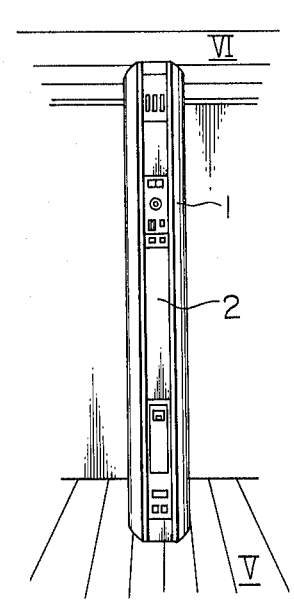

ELECTRIC EQUIPMENT CHANNEL

This invention relates to a pillar-shaped electric equipment channel and more particularly, to an electric equipment channel of console type to which powering, communicating, alarming systems and the like are collectively assembled.

The industrialization of the housing industry has progressed so quickly and the building method has changed so greatly that there have occurred problems in the electric wiring which can not be solved with such conventional electric wiring systems as the embedded wiring with electric wire pipes or the flowing wiring within hollow walls with U.V.F. cables. That is to say, with the factory production of building members, such building members which have performed roles of conventional wiring spaces such as floor surfaces, wall surfaces and ceiling surfaces have been improved to be in the form of simple panels to improve their productivity and realize their quantity supply and cost reduction by thoroughly standardizing and simplifying them. Therefore, instead of the system having a wiring space within a panel, a wiring system adapted to a building formed of a combination of simplified panels is strongly required and a new wiring system referred to as a "caseway wiring system" wherein wirings and instruments are fitted by using decorative wiring troughs made of plastics is developing.

However, though the wiring problems of such terminal instruments as switches and sockets have been solved, the system of fitting and wiring such components of power systems as distributing boards, contact breakers and the like has not been solved. For this reason, and in order to provide safety and convenience in houses and a better living environment, there are requirements that such functions as reporting of visitors, communications between rooms, emergency communication, emergency warning (such as of a fire, electric current leakage, crime prevention or gas leakage), automatic control of loads and remote control of various equipment should be easy to adopt and, as required, should be able to be easily changed or increased without altering the basic wiring. The present invention has been suggested to simplify provide a means for meeting such requirements.

An object of the present invention is to electric equipment wiring for buildings and, more particularly, to provide an electric equipment channel wherein various power system components such as instruments belonging to such power systems as of distributing boards, sockets, and the like, such reporting or communicating systems as telephones, interphones, televisions and the like and such calamity preventing systems as theft preventing instruments, fire alarms and the like can be fitted and wired independently of the building work.

Another object of the present invention is to provide an electric equipment channel wherein a part of the house and a pillar part, surrounding edge part and skirting board part which can appears as a part of the house interior are made an electric equipment and instrument containing part and a wiring circuit part so that the appearance of the interior of rooms will be simply prevented from being deteriorated by the fitting and wiring of such electric equipment and instruments.

As made clear from the following detailed explanation, according to the present invention, there can be provided a wiring system and electric equipment channel wherein the labor in the wiring work can be reduced, the maintenance of the wiring can be made easy, the efficiency in the installation of electric equipment can be improved and the cost thereof can be greatly reduce.

The present invention shall be explained with respect to certain embodiments in the following with reference to accompanying drawings, in which:

FIGS. 5A – 5C are perspective views showing certain alternative embodiments of the channel shell.

Figure 1:
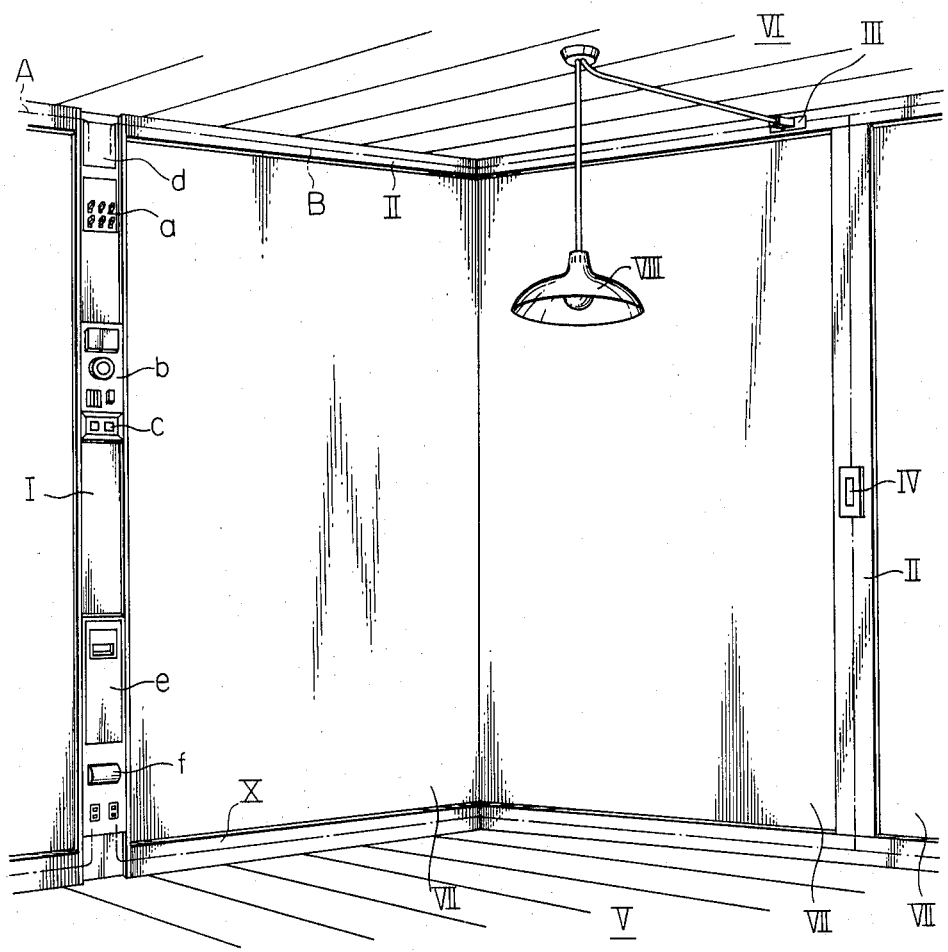
FIG. 1 is a perspective view showing an embodiment of the pillar-shaped electric equipment channel according to the present invention.

In FIG. 1 showing the pillar-shaped electric equipment channel of the present invention, as installed in a room, VII is a wall surface for partitioning rooms. I is a pillar-shaped electric equipment channel fitted to said wall surface VII. V is a floor surface and VI is a ceiling surface. II is a wire trough made of, in the present instance, in plastic a decorative appearance and fitted to the intersection of the ceiling surface VI and wall surface VII or to the wall surface VII or ceiling surface VI as surrounding edge or pillar. X is another decorative plastic wire trough fitted as skirting board. III and IV are respectively a socket and switch fitted to the wire trough II respectively at the surrounding edge and pillar. VIII is a lighting instrument suspended from the ceiling surface VI. $a$ to $f$ are various functional units fitted to the pillar-shaped electric equipment channel I, wherein $a$ is a distributing board unit, $b$ is a reporting instrument unit, $c$ is a control unit, $d$ is a box for receiving a power line, $e$ is a tool shelf, and $f$ is a foot light. A single or plurality of the above described various functional units are properly contained and fixed in the pillar-shaped electric equipment channel I kept in close contact with the ceiling VI or floor surface V of a structure with the box $d$ located at one end for the terminal wiring. Input and output wirings including a lead-in wire A from a main switch or ammeter and a feeding wiring B to any other power line box or equipment are wired to and from the box $d$. Such power system as an electric light distributing board and air conditioning power board, such reporting system as an interphone and response indicator and such calamity preventing system as a fire alarm and crime preventing alarm socket III, switch IV and the like fitted to the wire troughs II are concentrically contained and fixed in the pillar-shaped electric equipment channel I so that an electric source the for lighting and a switch circuit or socket wiring will be branched and wired from said box $d$.

Figure 3:
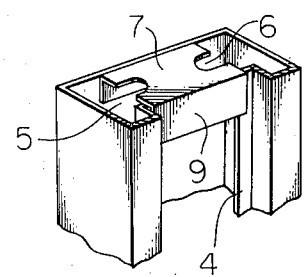
FIG. 3 is a fragmentary perspective view showing the upper or lower end of the channel with a joiner removed therefrom.
Figure 2:
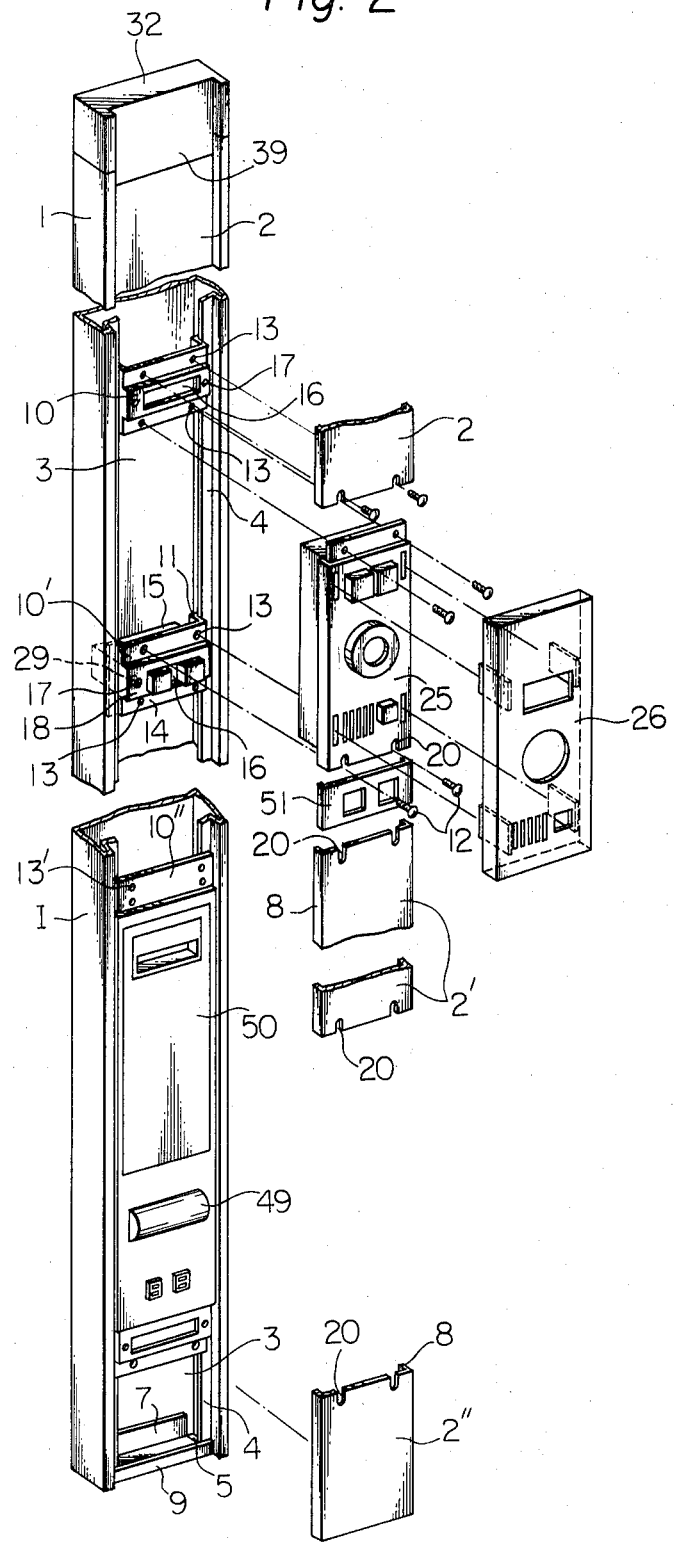
FIG. 2 is a perspective view of the channel shown in FIG. 1 as partly omitted and with certain elements disassembled.

Structure of the electric equipment channel will be detailed with reference to FIG. 2. A case or shell body 1 is formed in a long body member $a$ having channel-shaped or U-shaped cross-section with the longitudinal edges bent inwardly to form a pair of opposed flanges 4 recessed from the front surface of the channel by a pair of shallow interior sidewalls extending continuously along the opposite side edges of the channel 4 provided as bent along each side edge of an open surface 3 as shown in FIG. 3, and a fixed metal piece 7 having wiring holes 6 welded in the open part of the channel at the upper and lower ends. A cover member 2 is provided with bent flanges 8 formed integrally at both side edges in the lengthwise direction of the cover 2 fitted to the case body 1 so that said flanges 8 will fit between the shallow interior side walls and overlap the respective flanges 4, tightly inserted at the upper or lower end between a fixed frame 9 provided on the fixed metal piece 7 welded to the upper or lower end of the case body 1 and the 4 flanges so that said cover 2 will be fixed to the case body 1.

Now, the manner in which the other end of the cover 2 and such functional units as the socket and switch are fitted to the case body 1 shall be explained. Further in FIG. 2, 10 is a fitting band fixed by screwing or welding to the back or inside surfaces of the 4 flanges of the case body 1. Various electric equipment and the cover 2 to cover any spaces between said equipment are fitted to the front part of the case body 1 so that their front surfaces will be substantially in the same plane, by utilizing fitting holes 13 in the fitting band 10. An opening 16 made in a middle convex part of the fitting band 10 and a fitting hole 17 made on each of the right and left of the opening 16 are to fit the socket or switch unit 15 or the like.

In the drawing, 25 is a functional unit such as a fire alarm, crime preventing alarm, time reporter or the like to be fitted to the body 1 as secured between the two fitting band 10 and 10'. 26 is an ornamental cover for said functional unit. 15 is the small wiring instrument for a switch, socket or the like and having fitting holes 29 on the front surface. Said small wiring instrument 15 is fixed with screws 12 through the fitting holes 29 to the fitting holes 17 in the fitting band 10' so that its operating part will project of the opening 16 in the fitting band 10'. 51 is an ornamental plate fitted to the front exposed part of the fitting band 10' and wiring instrument 15. 2' is a cover for closing an open space of the case body 1 partly opening below the above wiring instrument 15. Fitting holes or grooves 20 in said cover 2' are lapped respectively over fitting holes 13 at the lower part of the fitting band 10' and fitting holes 13' in another fitting band 10'' fixed below the fitting band 10', and the cover and fitting bands are screwed together. The upper screwed part of the cover 2' is covered with the above mentioned cover 26 or 51 and the lower screwed part is covered with a cover for another unit set below the cover 2' or with a separate ornamental plate. 50 is a tool case secured to the case body 1 in the same manner as the other members below the cover 2'. 49 is a light permeable front cover of a foot light incorporated together with the tool case 50.

Figure 4:
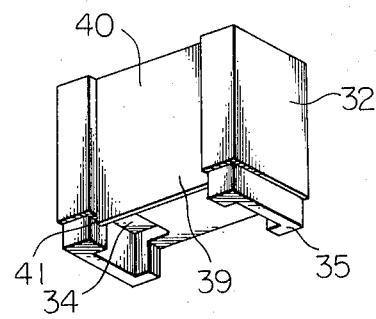
FIG. 4 is a perspective view of the joiner showing, in particular, the lower end thereof.

Next, a height adjusting means to be used in case the the height between the ceiling surface VI and floor surface V is somewhat different from or smaller than the standard dimension, when the pillar-shaped electric equipment channel I is to be fitted to the wall surface VIII ranging between the ceiling surface VI and floor surface V, shall be explained with reference to FIG. 4.

32 is a joiner formed of a wooden or synthetic resinous material which can be easily sawn, such as a low foaming stylol, A.B.S. or polypropylene, so as to be of substantially the same outer peripheral shape as of the case body I. The joiner 32 has a wire passing hole 34 made on each side part so that the lead-out wires within the pillar-shaped electric equipment channel I will be properly classified and divided and will be passed into the joiner 32 through the above mentioned wire passing holes 34 is the joiner 32 connected with the case body I through a projecting guide part 35 downwardly projecting on each side part of the bottom surface of the joiner 32. 39 is a covering part formed by projecting the lower end of a cover 40 of the joiner 32 corresponding to the cover 2 fitted to the open surface 3 of the case body I. Between the covering part 39 and projecting guide part 35, there is provided a clearance 41 into which the cover fitting flanges 4 of the case body 1 are to be inserted. As the joiner 32 is formed of a wooden or synthetic resinous material that is easy to saw such as a low foaming stylol, A.B.S. or polypropylene, the joiner 32 can be easily cut or drilled on the spot to freely adjust the height of the pillar-shaped electric equipment channel I in the practical laboring places.

As shown in FIGS. 5A – 5C the above described pillar-shaped electric equipment channel I may be of any various cross-section such as, for example, substantially a triangular, hexagonal, or circular cross-section. The triangular cross-section as in FIG. 5A-1 is adapted to fit in a substantially rectangular corner at the intersection of the wall surfaces VII as shown in FIG. 5A-2. The hexagonal cross-section (FIG. 5B-1) or circular cross-section (FIG. 5C-1) is adapted to fit in the middle of a large room as in FIG. 5B-2 or in FIG. 5C-2, so that a functional unit, alarm, control switch and foot light may be fitted and fixed in any direction of the pillar-shaped electric equipment channel.

As the pillar-shaped electric equipment channel I of the present invention is of the above described structure, as shown in FIG. 1, the channel is provided in contact with the wall surface and is connected at its upper end with the upper wire trough II, which form a surrounding edge adjacent the ceiling surface VI and at its lower end with the lower wire trough X, which form skirting board adjacent the floor surface. Therefore, for example, where the wire trough II is to be used as a wiring duct, the electric wires to be arranged within it are introduced into the case body 1 through the upper end, or even optionally through the lower end, of the case body 1, as wired through the wiring holes made on the contact surface of the upper or lower end of the case body. Thus the system which can be used either as the ceiling edge or skirting board, and connected to such functional unit 15 as a switch or socket screwed to the fitting band 10 fixed to the case body 1. The cover 2 is fitted so that the wiring work will be concealed within the case body 1. Thus the wiring is made much simpler and easier than any conventional work or system wherein the functional unit is fixed through fixing holes preliminarily made on the wall surface, and wherein the wiring must be made before finishing the wall surface. According to the present invention, the electric work can be made at any time after the completion of the building work.

Further, since the pillar-shaped electric equipment channel I of the present invention is arranged on the wall surface continuously from the ceiling surface VI down to the wall surface V, and the open surface of the case body 1 is closed completely with the cover 2, the channel provides an appearance of an actual pillar so as to be seen as a part of the building.

What we claim is:

1. An electrical equipment channel system comprising the combination of a vertical main channel fixed to an interior wall surface of a room, extending from the ceiling to the floor of the room, and providing the appearance of a pillar-shaped construction member, said main channel having a substantially U-shaped cross section with the open end of the U on the front surface thereof, the longitudinal edges of said channel forming a pair of opposed lateral flanges recessed from the front surface of said channel by a pair of shallow interior side walls and extending continuously along the opposite side edges of the channel opening; a plurality of horizontal subordinate channels communicating with the vertical main channel for receiving a plurality of electric distribution lines from the main channel and for mounting terminal devices connected to said distribution lines, said subordinate channels being fixed to interior wall surfaces of at least one room and providing the appearance of edge construction members; a plurality of fitting bands secured to said lateral flanges at vertically spaced locations and extending across the open end of the U on the front surface of said channel so that the rear portion of the channel remains open to form a continuous vertical passage, box means mounted within the vertical main channel near the upper end thereof for receiving an electric power source line; distribution board also mounted on at least one of said fitting bands below said pull box for receiving the electrical power source line and connecting said line to a plurality of said electric distribution lines branching into the horizontal subordinate channels for connection to said terminal devices, said distribution board including a front portion which fits between the shallow interior side walls of said channel and overlaps said lateral flanges; a plurality of additional electrical units mounted on said fitting bands with each of the units including a front portion which fits between the shallow interior side walls of said channel and overlaps said lateral flanges, each of said electrical units being connected to at least a portion of said distribution lines; and a plurality of cover plates mounted on said fitting bands in the vertical spaces between said distribution board and the additional electrical units, each of said cover plates fitting between the shallow interior side walls and overlapping said lateral flanges.

* * * * *